April 24, 1951 C. W. ZIES ET AL 2,549,997
PLUG SEAL FOR SOLVENT EXTRACTION COLUMNS
Filed Dec. 9, 1948 2 Sheets-Sheet 1

INVENTORS
CARL W. ZIES &
FREDERICK W. WEIGEL
BY
*Hyde, Meyer, Baldwin & Doran*
ATTORNEYS

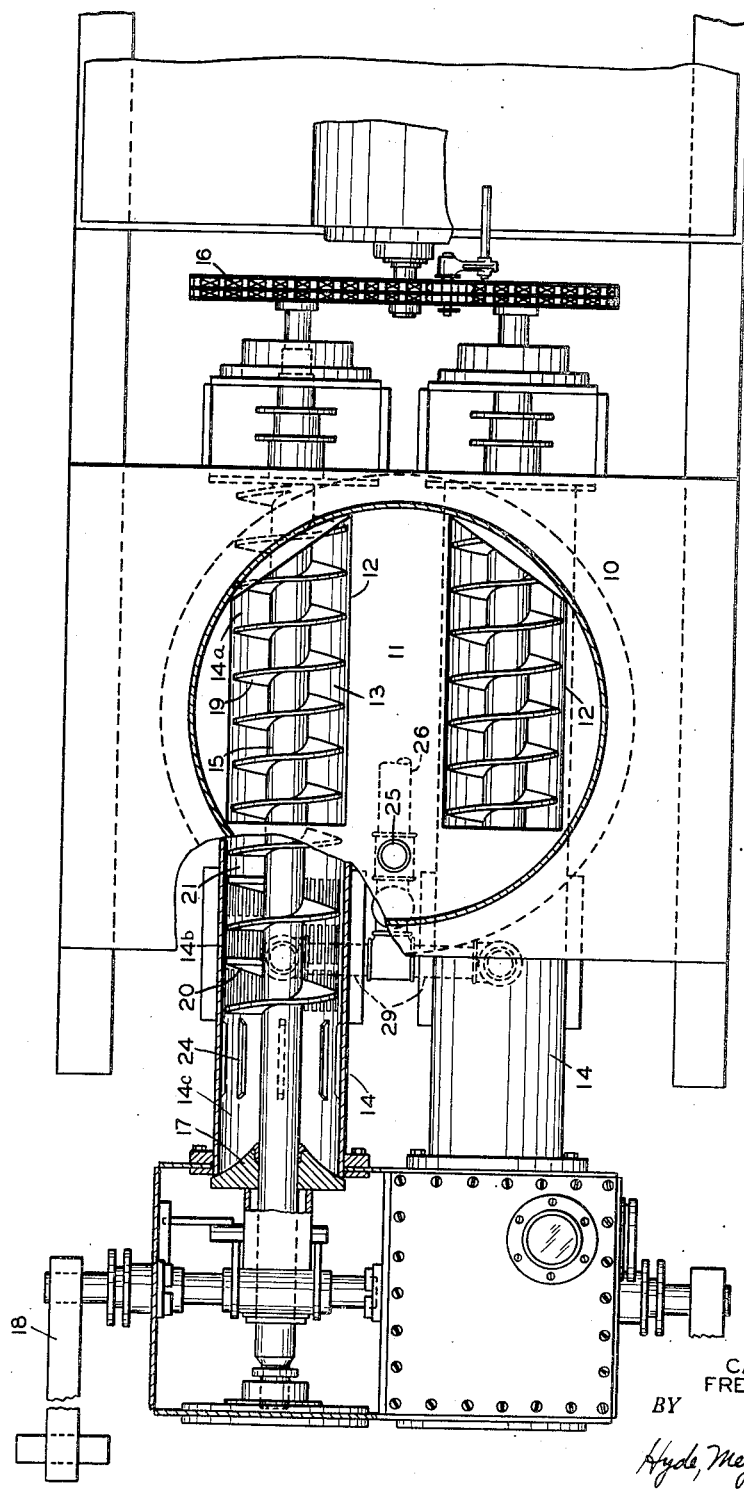

Patented Apr. 24, 1951

2,549,997

UNITED STATES PATENT OFFICE 2,549,997

PLUG SEAL FOR SOLVENT EXTRACTION COLUMNS

Carl W. Zies, Lakewood, and Frederick W. Weigel, Fairview Village, Ohio, assignors to The V. D. Anderson Company, Cleveland, Ohio, a corporation of Ohio Application December 9, 1948, Serial No. 64,268

3 Claims. (Cl. 23—270)

This invention relates to solvent extraction apparatus for removing oil from seeds, nuts or other oil bearing material, and more particularly to outlet valve mechanism by means of which the solid residue after the oil has been removed, is continuously discharged from the bottom of the extracting tower. The invention is an improvement upon that described and claimed in a prior application for Outlet Valve Mechanism for Solvent Extraction Plants, Serial Number 706,221, filed October 28, 1946, by Carl W. Zies, to which reference may be had if desirable or necessary.

In the operation of a solvent extraction plant of the kind for which the outlet valve mechanism of the said application was designed, the mixture entering the screw shaft at the bottom of the column runs about 60 percent liquid and 40 percent solid, and the solid material discharged beyond the choke at the far end of the screw contains about 30 percent of liquid. This means that as the screw compresses the solid material, about 65 percent of the total volume is washed or caused to flow backwardly along the screw and thus return to the mixture column from which it came. The resulting turbulence in the zone of supply to the screw, increased by that due to influx of fresh solvent liquid in the same zone, materially reduces efficiency and capacity of the screws to separate the solids from the mixture. Also it tends to defeat any possibility of producing and maintaining a solid, compact leak proof plug of solid material along and around the screw, and which is essential to hold up the liquid in the extracting column and prevent its leakage or loss and the resulting impairment of efficiency.

The present invention has for its object to provide an improved arrangement for withdrawing the solids from and admitting solvent to the extracting tower in such manner as to produce and maintain a compact impervious plug of the solid material and thereby prevent undesired leakage or escape of liquid through or past the plug, such as might result in loss of liquid head in the column.

A further object is to provide improved screw press valve mechanism for use in withdrawing solids from an extracting tower, such mechanism being equipped with drainage means for taking out the expressed liquid by flow with instead of against the stream, and so arranged as to return such liquid to the extracting column in a manner to reduce or prevent turbulence.

Still another object is to generally improve the outlet valve mechanism for the solid material by the use of a press barrel which is partly imperforate and partly perforate for drainage of liquid from the mass as it becomes more and more compact, but without any tendency toward turbulence or the backward flow of solid material.

Further objects of the invention in part are obvious and in part will appear more in detail hereinafter. In the drawings, which represent one suitable embodiment of the invention, Fig. 1 is a sectional elevation, on the line 1—1, Fig. 2, showing our improved valve mechanism applied to the lower end of a solvent extraction tower;

Fig. 3 is a sectional plan view on the line 3—3, Fig. 1.

Figure 1:
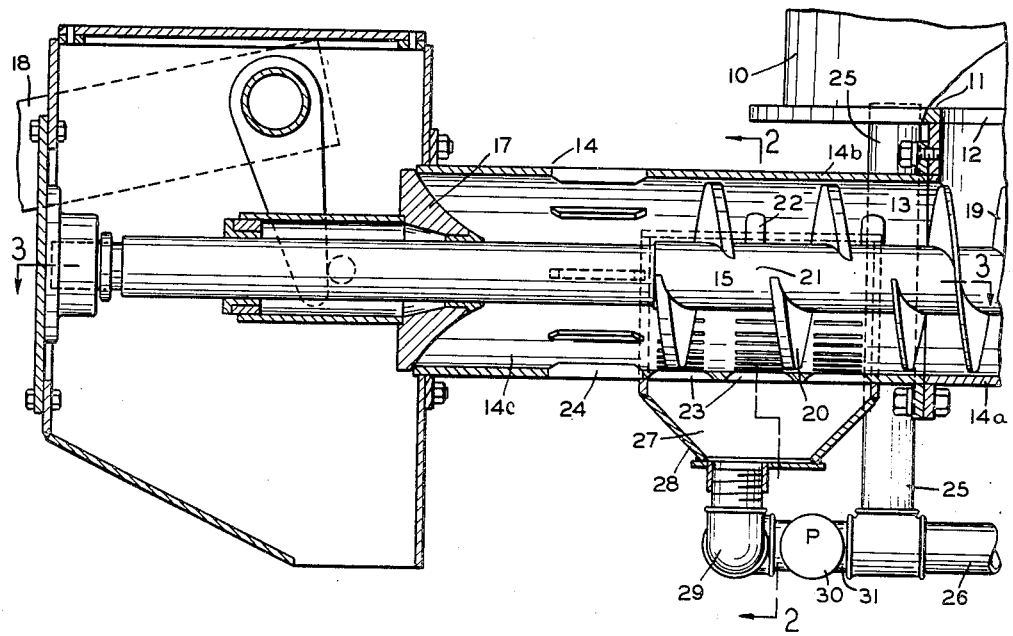
Figure 2:
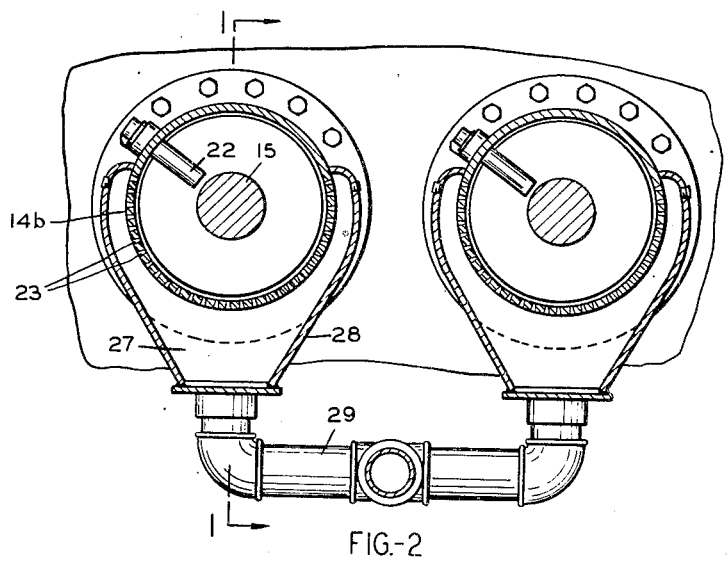
Fig. 2 is a cross section on the line 2—2, Fig. 1.

Referring to the drawings, the mechanism illustrated in large measure is similar to that shown in the aforesaid application Serial Number 706,221 and therefore requires but brief description.

10 indicates the lower end of the cylindrical extraction tower in which the solid material to be oil extracted descends in counter current relation to the ascending stream of solvent liquid. The bottom or floor 11 of the extracting chamber is provided with two generally rectangular openings 12, each leading to the chamber 13 within a cylindrical barrel 14 in which rotates a worm shaft 15. Two shafts are employed for maximum capacity, but one might be sufficient in certain instances. Since the two are alike, one only need be described.

The two shafts 15 are driven simultaneously or in unison by power supplied to one end of each shaft, such as to sprocket wheels 16. At its opposite end each shaft supports suitable choke mechanism for the discharge end of its barrel, such as the slidable choke cone 17 yieldingly advanced by weight arm 18. Adjustment of the weight determines the maximum pressure to be applied to the solid material by the worm shaft and the consequent compactness or density of the plug of solid material which is discharged past the cone, as is usual.

The press barrel includes three distinct parts, although they may be fabricated as a single unit. The first part 14a of the barrel, lying beneath openings 12, is an imperforate plain cylinder, open only at its top to receive the descending mixture of liquid and solid material. Within this zone of the barrel the shaft 15 is provided with a continuous worm flight 19 of several turns, as many as eight or more, which serve to gather or collect the settling solids and feed or advance them as a mass to the next or compressing section.

This comprises a perforate barrel portion 14b of any suitable form for the purpose, within which the shaft 15 is provided with several separate worm flights or sections 20 (two being shown) separated longitudinally by spaces or gaps 21 into each of which projects an abutment or stop 22 to prevent rotation bodily of the mass of solid material under compression. These stops are shown as screws insertable through and adjustable in threaded openings in the barrel wall, a common arrangement for the purpose.

Barrel section 14b is here made perforate by forming it from a section of steel tubing provided with a series of longitudinally extending narrow kerfs or slots 23 distributed at intervals all or part way around, as shown. The slots are narrow enough to prevent passage or escape of solid material and are numerous enough to permit discharge of sufficient liquid, so that the mixture advancing along the barrel in this zone becomes more and more compressed, finally forming a dense compact plug which serves as a valve or stopper to entirely prevent loss or escape of liquid through the plug and past the choke device.

Beyond the perforate barrel section 14b, the barrel includes a third part 14c, which again is imperforate or of plain tubular form, like the first section 14a. Shaft 15 here is also plain having no worm flights or sections. Means is provided however for preventing rotation bodily of the advancing compact plug, such as a series of longitudinally extending parallel ribs 24 spaced around the inside surface of the barrel and welded thereto.

In the extracting tower the rotating agitating arms or scrapers traveling over baffle plates distributed vertically at intervals along the tower permit the solid material to descend slowly with minimum agitation. Fresh solvent liquid is supplied in relatively small quantity, or at a slow rate of flow, and here is supplied in such manner as to minimize turbulence at the very bottom of the tower where the solvent material passes through the openings 12 into the feeding cavity of the barrel around the flights 19 of the feed worm. For this purpose the fresh solvent liquid, or at least the makeup portion thereof, is introduced to the tower chamber at a point remote from the feed openings 12, to wit, to an inlet or supply pipe 25 in the floor of the chamber at a point remote from openings 12, liquid being conducted to the inlet connection 25 by a pipe 26 coming from a pump (not shown) communicating with a reservoir or other source of supply of solvent liquid. Thus, the solid material in the mixture settles quietly into the feed portion of the barrel and is advanced by the continuous worm therein to the second or perforate barrel section. Here, rotation of the solid mass is prevented by the abutment or stop members and the separate worm flights apply pressure to the mass, not only advancing it bodily, but also more and more compressing it as it moves along. The liquid within the mass escapes or emerges through the slotted perforations 23, all of which communicate with a liquid discharge chamber 27 within a housing or casing 28 embracing or enclosing all or a portion of the second or perforate section of the barrel. Liquid forced into this chamber 27 may include a small quantity of fines, but none of the larger particles, depending of course upon the smallness of the perforations. Whatever is discharged into chamber 27 is conducted by pipe 29 to a pump 30 provided with a discharge pipe 31 communicating with the chamber within the extraction tower. This liquid may enter the tower chamber through its own inlet thereto, but as shown, pipe 31 is connected to inlet connection 25, so that the liquid expressed in the perforate section of the barrel reenters the extraction tower chamber by way of the same pipe through which makeup liquid is supplied.

Beyond the perforate barrel section the compact, dense plug formed by the increasing compression in the perforate barrel section advances without rotation, due to the restraining effect of ribs 24, and emerges in thin sheet form around the edges of the choke cone.

The net effect of the entire arrangement is to insure the production and maintenance of a dense compact plug of the solid material, which prevents any escape of liquid past the cone and will maintain the proper head of liquid in the tower, even when liquid flow is stopped for any reason.

Generally speaking the mass of material entering the feed chamber around the worms includes about sixty percent liquid and forty percent solid material. As this mixture advances along the perforate portion of the barrel about sixty-five percent of the total volume is expelled in the form of liquid. However, this liquid does not move backwardly along the worm shaft, with consequent tendency to produce turbulence in the mass of material being fed, but is taken out from the barrel by lateral expression through its perforations. The liquid is then returned to the tower chamber at a point remote from the entrances to the feed chambers around the worms and without any counter current effect upon the downwardly moving mass of mixture.

Thus, turbulence is very considerably minimized with a surprising increase in overall efficiency. The solid product of the tower contains a minimum of liquid and thus reduces the quantity of liquid to be evaporated and condensed, and the cost of such treatment. Further, considerably greater capacity is possible with screw valve mechanism of definite size and the plant as a whole is more stable in operation.

Other advantages of the invention will be apparent to those skilled in the art.

What we claim is:

1. Extraction apparatus, comprising in combination a chambered, cylindrical, upright extracting tower having a bottom floor provided with a discharge opening, a cylindrical barrel horizontally disposed beneath said floor and provided with an imperforate feeding section, means providing a discharge path between said discharge opening and said feeding section, a portion of said barrel adjoining said feed section constituting an expressing section, the cylindrical wall of said expressing section being provided with perforations to permit liquid escape therethrough, another portion of said barrel constituting a plug-forming section and being disposed adjacent said expressing section and remote from said feeding section, there being means for continuously advancing solid material through said sections in the order mentioned, consisting of a rotatable shaft extending through said barrel and provided with a continuous multiple-turn feeding screw within said feeding section and an expressing worm having a plurality of longitudinally spaced worm flights within said expressing section, the cylindrical barrel wall surrounding said plug-forming section being imperforate, a yielding choke being provided at the end of said plug-forming section remote from said expressing section, jacket means constituting an expressed liquid collecting housing surrounding the perforate portion of the expressing section of said barrel, and liquid transfer means communicating with said housing and with said tower for returning expressed liquid to said tower.

2. Apparatus as defined in claim 1 wherein said liquid transfer means consists of a conduit communicating at its one end with the lower portion of said housing and at its other end with said tower, and a pump in the return path of liquid flow for effecting such liquid transfer through said conduit.

3. Extraction apparatus, comprising in combination a chambered, cylindrical, upright extracting tower having a bottom floor provided with a discharge opening, a cylindrical barrel horizontally disposed beneath said floor and provided with an imperforate feeding section, means providing a discharge path between said discharge opening and said feeding section, a portion of said barrel adjoining said feed section constituting an expressing section, the cylindrical wall of said expressing section being provided with perforations to permit liquid escape therethrough, another portion of said barrel constituting a plug-forming section and being disposed adjacent said expressing section and remote from said feeding section, there being means for continuously advancing solid material through said sections in the order mentioned, consisting of a rotatable shaft extending through said barrel and provided with a feeding screw within said feeding section and an expressing worm within said expressing section, the cylindrical barrel wall surrounding said plug-forming section being imperforate, a yielding choke being provided at the end of said plug-forming section remote from said expressing section, jacket means constituting an expressed liquid collecting housing surrounding the perforate portion of the expressing section of said barrel, and liquid transfer means communicating with said housing and with said tower for returning expressed liquid to said tower.

CARL W. ZIES.
FREDERICK W. WEIGEL.

REFERENCES CITED

The following references are of record in the file of this patent:

UNITED STATES PATENTS

| Number | Name | Date |
|---|---|---|
| 1,685,534 | Drahn | Sept. 25, 1928 |
| 1,748,356 | Lawrence | Feb. 25, 1930 |
| 1,971,632 | Anderson | Aug. 28, 1939 |
| 2,183,837 | Hamilton et al. | Dec. 19, 1939 |
| 2,184,248 | Bonotto | Dec. 19, 1939 |
| 2,203,666 | Bonotto | June 11, 1940 |
| 2,355,091 | McDonald | Aug. 8, 1944 |

FOREIGN PATENTS

| Number | Country | Date |
|---|---|---|
| 157,155 | Great Britain | Jan. 25, 1922 |